(12) United States Patent
Kim (10) Patent No.: US 12,382,960 B2
(45) Date of Patent: Aug. 12, 2025

(54) ANTIMICROBIAL AGENT AND ANTIMICROBIAL RESIN COMPOSITION COMPRISING THE SAME

(71) Applicant: KOREA INSTITUTE OF MATERIALS SCIENCE, Changwon-si (KR)

(72) Inventor: Chang-su Kim, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 61 days.

(21) Appl. No.: 17/831,705

(22) Filed: Jun. 3, 2022

(65) Prior Publication Data
US 2023/0119973 A1   Apr. 20, 2023

(30) Foreign Application Priority Data

Oct. 18, 2021 (KR) .................. 10-2021-0138637
Dec. 29, 2021 (KR) .................. 10-2021-0191608

(51) Int. Cl.
| | | |
|---|---|---|
| *A01N 59/16* | (2006.01) | |
| *A01N 25/02* | (2006.01) | |
| *A01N 25/10* | (2006.01) | |
| *A01P 1/00* | (2006.01) | |
| *A61P 1/00* | (2006.01) | |

(52) U.S. Cl.
CPC ............. *A01N 59/16* (2013.01); *A01N 25/02* (2013.01); *A01N 25/10* (2013.01); *A01P 1/00* (2021.08)

(58) Field of Classification Search
CPC ....................................... A01N 59/16
See application file for complete search history.

(56) References Cited

U.S. PATENT DOCUMENTS

2019/0099510 A1*  4/2019  Furudate ................. A61L 9/014

FOREIGN PATENT DOCUMENTS

| | | | |
|---|---|---|---|
| CN | 1058379939 | * | 8/2016 |
| CN | 105941476 | * | 9/2016 |
| KR | 20120116387 | | 10/2012 |
| KR | 20190089665 | | 7/2019 |

* cited by examiner

*Primary Examiner* — Sarah Alawadi
(74) *Attorney, Agent, or Firm* — LEX IP MEISTER, PLLC (57) ABSTRACT

An antimicrobial agent and an antimicrobial resin composition comprising the same are provided. More particularly, an antimicrobial agent that has excellent antimicrobial activity even when a small amount is added and may minimize the influence on physical properties of an applied product such as an antimicrobial film, an antimicrobial resin composition comprising the same, and methods of preparing the antimicrobial agent and the antimicrobial resin composition are provided.

2 Claims, 4 Drawing Sheets

ANTIMICROBIAL AGENT AND ANTIMICROBIAL RESIN COMPOSITION COMPRISING THE SAME

CROSS REFERENCE TO RELATED APPLICATION

This application claims the benefit of Korean Patent Application No. 10-2021-0138637, filed on 18 Oct. 2021, entitled "ANTIMICROBIAL AGENT AND ANTIMICROBIAL RESIN COMPOSITION COMPRISING THE SAME", and Korean Patent Application No. 10-2021-0191608, filed on 29 Dec. 2021, entitled "ANTIMICROBIAL AGENT AND ANTIMICROBIAL RESIN COMPOSITION COMPRISING THE SAME", which are hereby incorporated by reference in their entireties into this application.

BACKGROUND OF THE INVENTION

1. Technical Field

The present disclosure relates to an antimicrobial agent and an antimicrobial resin composition comprising the same. More particularly, the present disclosure relates to an antimicrobial agent that has excellent antimicrobial activity even when a small amount is added and may minimize the influence on physical properties of an applied product such as an antimicrobial film, an antimicrobial resin composition comprising the same, and methods of preparing the antimicrobial agent and the antimicrobial resin composition.

2. Description of the Related Art

Recently, as interest in the prevention and hygiene of infections caused by various bacteria and viruses has increased, the preference for products having antimicrobial activities among products frequently contacted in daily life has also increased. In relation to this, various information technology (IT) devices such as a smartphone, a laptop, and a monitor are also required to have antimicrobial activities. In addition, it is important for a resin or film applied to IT devices or the like to maintain various optical properties and the original physical properties even when an antimicrobial material is added to add an antimicrobial function.

In the case of inorganic antimicrobial agents such as silver nanoparticles, zeolite, calcium phosphate, zirconium phosphate, and silica gel, which are widely used as antimicrobial materials in the related art, it is difficult to maintain the original physical properties including optical properties when applied to the various products described above. Furthermore, as an issue about the harmfulness of antimicrobial materials to the human body, safety has also become as an important issue.

Therefore, it is required to develop an antimicrobial material that may exhibit antimicrobial activity while maintaining the original physical properties of a resin and is formed of a safe material.

As a background art of the present disclosure, Korean Patent No. 10-2051622 discloses a method of preparing an inorganic antimicrobial agent and an inorganic antimicrobial agent prepared by the method.

SUMMARY OF THE INVENTION

An object of the present disclosure is to provide an antimicrobial agent that has excellent antimicrobial activity even when a small amount is added and is safe.

Another object of the present disclosure is to provide an antimicrobial agent and an antimicrobial resin composition that may minimize the influence on physical properties of an applied product such as an antimicrobial film.

Still another object of the present disclosure is to provide methods of efficiently preparing an antimicrobial agent and an antimicrobial resin composition that have excellent antimicrobial activity and may maintain the original physical properties of a resin.

Other objects and advantages of the present disclosure will be more apparent by the following detailed description, the claims, and the drawings.

According to an aspect, an antimicrobial agent comprises: a solvent; a salt of zinc dissolved in the solvent; and a salt of silver dissolved in the solvent, wherein the antimicrobial agent is a solution phase.

According to an exemplary embodiment, the salt of zinc may be contained in an amount of 0.1 to 50 parts by weight with respect to a total weight of the antimicrobial agent, the salt of silver may be contained in an amount of 0.1 to 20 parts by weight with respect to the total weight of the antimicrobial agent, and the solvent may be contained in an amount of 30 to 99.8 parts by weight with respect to the total weight of the antimicrobial agent.

According to an exemplary embodiment, the salt of zinc may be one or more of zinc nitrate hexahydrate ($Zn(NO_3)_2 \cdot 6H_2O$) and zinc perchlorate hexahydrate ($ZnCl_2O_8 \cdot 6H_2O$).

According to an exemplary embodiment, the salt of silver may be silver nitrate ($AgNO_3$).

According to an exemplary embodiment, the solvent may be one or more selected from isopropyl alcohol (IPA, 2-propanol), water, 2-methoxyethanol, acetonitrile, dimethyl sulfoxide, ethylene glycol, butyl acetate, methyl isobutyl ketone (4-methyl-2-pentanone), propylene glycol methyl ether acetate, ethanol, N,N-dimethylformamide, and ethylene glycol monoethyl ether (2-ethoxyethanol).

According to another aspect, an antimicrobial resin composition comprises the antimicrobial agent and a resin.

According to an exemplary embodiment, the antimicrobial agent may be contained in an amount of 0.5 to 5 parts by weight with respect to a total weight of the antimicrobial resin composition.

According to an exemplary embodiment, the resin may be a film resin.

According to still another aspect, a method of preparing an antimicrobial agent comprises: a step i) of adding a salt of zinc to a solvent and dissolving the salt of zinc; a step ii) of adding a salt of silver to a solution to which the salt of zinc is added to prepare a mixed solution; and a step iii) of stirring the mixed solution.

According to an exemplary embodiment, the salt of zinc may be added in an amount of 0.1 to 50 parts by weight with respect to a total weight of the antimicrobial agent, the salt of silver may be added in an amount of 0.1 to 20 parts by weight with respect to the total weight of the antimicrobial agent, and the solvent may be added in an amount of 30 to 99.8 parts by weight with respect to the total weight of the antimicrobial agent.

According to an exemplary embodiment, the salt of zinc in the step i) may be one or more of zinc nitrate hexahydrate ($Zn(NO_3)_2 \cdot 6H_2O$) and zinc perchlorate hexahydrate ($ZnCl_2O_8 \cdot 6H_2O$).

According to an exemplary embodiment, the solvent in the step i) may be one or more selected from isopropyl alcohol (IPA, 2-propanol), water, 2-methoxyethanol, acetonitrile, dimethyl sulfoxide, ethylene glycol, butyl acetate, methyl isobutyl ketone (4-methyl-2-pentanone), propylene glycol methyl ether acetate, ethanol, N,N-dimethylformamide, and ethylene glycol monoethyl ether (2-ethoxyethanol).

According to an exemplary embodiment, the salt of silver in the step ii) may be silver nitrate ($AgNO_3$).

According to an exemplary embodiment, a stirring time in the step iii) may be 30 minutes to 2 hours.

According to still another aspect, a method of preparing an antimicrobial resin composition includes a step of mixing the antimicrobial agent with a resin, wherein the antimicrobial agent is mixed in an amount of 0.5 to 5 parts by weight with respect to a total weight of the antimicrobial resin composition.

DESCRIPTION OF EXEMPLARY EMBODIMENTS

The objects, specified features, and novel features of the present disclosure will be more apparent from the following detailed description and exemplary embodiments taken in connection with the accompanying drawings.

The terms and words used in the present specification and claims should not be interpreted as being limited to common and dictionary meanings, but should be interpreted as having meanings and concepts relevant to the technical idea of the present disclosure based on a principle that the inventors may appropriately define the concepts of terms in order to describe their own inventions in the best mode.

In the present specification, when it is described that one component such as a layer, a portion, or a substrate is "positioned on", "connected to", or "coupled to" another component, it may be interpreted that one component is directly "positioned on", "connected to", or "coupled to" another component, or may be present with one or more other components interposed between both the components. On the contrary, when it is described that one component is "directly positioned on", "directly connected to", or "directly coupled to" another component, another component may not be interposed between both the components.

Terms used in the present specification are used only in order to describe specific exemplary embodiments rather than limiting the present disclosure. Singular forms are intended to include plural forms unless the context clearly indicates otherwise.

It should be further understood that term "comprise(s)" or "have(has)" used in the present specification specifies the presence of features, numerals, steps, operations, components, parts described in the present specification, or combinations thereof, but does not preclude the presence or addition of one or more other features, numerals, steps, operations, components, parts, or combinations thereof.

In the present specification, "comprising" any component will be understood to imply the inclusion of other components rather than the exclusion of other components, unless explicitly described otherwise. In addition, throughout the specification, the term "positioned on" may indicate that a component is positioned on or under an object, and does not necessarily mean that a component is positioned on the object based on a gravity direction.

Since the present disclosure may be variously modified and have several exemplary embodiments, specific exemplary embodiments will be illustrated in the drawings and be described in detail in a detailed description. However, it is to be understood that the present disclosure is not limited to the specific exemplary embodiments, but includes all modifications, equivalents, and substitutions included in the spirit and the technical scope of the present disclosure. When it is determined that a detailed description for any known art related to the present disclosure may obscure the gist of the present disclosure, the detailed description will be omitted.

Hereinafter, an exemplary embodiment of the present disclosure will be described in detail with reference to the accompanying drawings. In describing an exemplary embodiment of the present disclosure with reference to the accompanying drawings, components that are the same as or correspond to each other will be denoted by the same reference numerals, and an overlapped description thereof will be omitted.

According to an aspect, an antimicrobial agent according to the present disclosure contains: a solvent; a salt of zinc dissolved in the solvent; and a salt of silver dissolved in the solvent, wherein the antimicrobial agent is a solution phase.

The present inventors have found that when a salt of silver is added to a solution of a salt of zinc dissolved in a solvent, an antimicrobial agent may have excellent antimicrobial activity even when a small amount is added and may minimize the influence on physical properties of an applied product such as an antimicrobial film, thereby completing the present disclosure. In addition, the antimicrobial agent of the present disclosure is safe because it does not contain safety regulation substances such as zeolite and quaternary ammonium salts.

The salt of zinc may be included in an amount of 0.1 to 50 parts by weight, preferably 0.1 to 40 parts by weight, more preferably 0.1 to 30 parts by weight, still more preferably 0.1 to 20 parts by weight, still more preferably 0.5 to 20 parts by weight, and still more preferably 1 to 20 parts by weight, with respect to the total weight of the antimicrobial agent, in terms of improving antimicrobial activity and solubility and minimizing the influence on physical properties of an applied product. Although not limited thereto, when the salt of zinc is included in an amount of less than 0.1 parts by weight with respect to the total weight of the antimicrobial agent, antimicrobial activity may be insufficient, and when the salt of zinc is included in an amount of more than 50 parts by weight with respect to the total weight of the antimicrobial agent, solubility and compatibility with the salt of silver may be reduced.

Although not limited thereto, the salt of zinc may be preferably one or more of zinc nitrate, zinc perchlorate, and zinc acetate, and more preferably one or more of zinc nitrate hexahydrate ($Zn(NO_3)_2 \cdot 6H_2O$) and zinc perchlorate hexahydrate ($ZnCl_2O_8 \cdot 6H_2O$), in terms of improving antimicrobial activity and solubility, minimizing the influence on physical properties of an applied product, and improving compatibility with the salt of silver.

The salt of silver may be included in an amount of 0.1 to 50 parts by weight with respect to the total weight of the antimicrobial agent in terms of improving antimicrobial activity and solubility. The salt of silver may be included in an amount of preferably 0.1 to 30 parts by weight, more preferably 0.1 to 20 parts by weight, still more preferably 0.1 to 10 parts by weight, still more preferably 0.1 to 5 parts by weight, still more preferably 0.1 to 2 parts by weight, and still more preferably 0.5 to 2 parts by weight, with respect to the total weight of the antimicrobial agent, in terms of improving antimicrobial activity and solubility and minimizing the influence on physical properties of an applied product. Although not limited thereto, when the salt of silver is included in an amount of less than 0.1 parts by weight with respect to the total weight of the antimicrobial agent, antimicrobial activity may be insufficient, and when the salt of silver is included in an amount of more than 50 parts by weight with respect to the total weight of the antimicrobial agent, solubility and cost-effectiveness may be reduced.

Although not limited thereto, the salt of silver may be preferably one or more of silver nitrate ($AgNO_3$) and silver acetate ($AgC_2H_3O_2$), and more preferably silver nitrate, in terms of improving antimicrobial activity and solubility, minimizing the influence on physical properties of an applied product, and improving compatibility with the salt of zinc.

The solvent may be included in an amount of preferably 30 to 99.8 parts by weight with respect to the total weight of the antimicrobial activity, in terms of improving antimicrobial activity and solubility and minimizing the influence on physical properties of an applied product.

The solvent may be one or more of alcohol and water, and may be appropriately selected depending on a resin composition or product requiring antimicrobial activity to which the antimicrobial agent is applied. The solvent may be one or more selected from isopropyl alcohol (IPA, 2-propanol), water, 2-methoxyethanol, acetonitrile, dimethyl sulfoxide, ethylene glycol, butyl acetate, methyl isobutyl ketone (MIBK, 4-methyl-2-pentanone), propylene glycol methyl ether acetate (PMA), ethanol, N,N-dimethylformamide, ethylene glycol monoethyl ether (2-ethoxyethanol), 1-propyl alcohol (1-propanol), propylene glycol, propylene glycol methyl ether (PGME, 1-methoxy-2-propanol), methyl ethyl ketone (MEK, 2-butanone), xylene, and methyl acetate, but is not limited thereto. The solvent may be more preferably one or more selected from isopropyl alcohol (IPA, 2-propanol), water, 2-methoxyethanol, acetonitrile, dimethyl sulfoxide, ethylene glycol, butyl acetate, methyl isobutyl ketone (4-methyl-2-pentanone), propylene glycol methyl ether acetate, ethanol, N,N-dimethylformamide, and ethylene glycol monoethyl ether (2-ethoxyethanol), and still more preferably one or more selected from isopropyl alcohol (IPA, 2-propanol), water, and 2-methoxyethanol, in terms of improving antimicrobial activity and solubility, minimizing the influence on physical properties of an applied product, and improving compatibility with the salt of zinc and the salt of silver.

According to another aspect, an antimicrobial resin composition according to the present disclosure contains the antimicrobial agent and a resin.

Although not limited thereto, the antimicrobial agent is included in an amount of preferably 0.5 to 5 parts by weight, more preferably 0.5 to 4 parts by weight, still more preferably 1 to 4 parts by weight, and still more preferably 1 to 3 parts by weight, with respect to the total weight of the antimicrobial resin composition, in terms of improving antimicrobial activity and maintaining the original physical properties of a product to which the antimicrobial resin composition is applied. Although not limited thereto, when the antimicrobial agent is included in an amount of less than 0.5 parts by weight with respect to the total weight of the antimicrobial resin composition, antimicrobial activity may be insufficient, and when the antimicrobial agent is included in an amount of more than 5 parts by weight with respect to the total weight of the antimicrobial resin composition, in a case of a transparent film requiring properties such as a light transmittance, physical properties thereof may be deteriorated.

Various known resins may be applied as the resin. Although not limited thereto, the resin may be one or more of a film resin, a transparent resin, a hard coating resin, and an opaque resin, and the film may be a UV curable film or a thermosetting film. Although not limited thereto, the resin may be preferably a film resin. This is because it is important for a film formed of the film resin to be applied to electronic devices to have physical properties such as a light transmittance, a haze, chromaticity, strength, and an adhesive force. The antimicrobial resin composition is prepared in the form of a film and may be applied as a coating agent to various known electrical and electronic products. In this case, as described above, the antimicrobial agent of the present disclosure not only has excellent antimicrobial activity, but also has little influence on physical properties of a coating agent prepared using the antimicrobial resin composition, such as a light transmittance, a haze, chromaticity, strength, and an adhesive force. Therefore, the original physical properties may be maintained.

Accordingly, the antimicrobial resin composition containing the antimicrobial agent according to the present disclosure may provide excellent antimicrobial activity for a long period of time while minimizing the influence on physical properties of an applied product such as a transparent film as described above.

Figure 1:
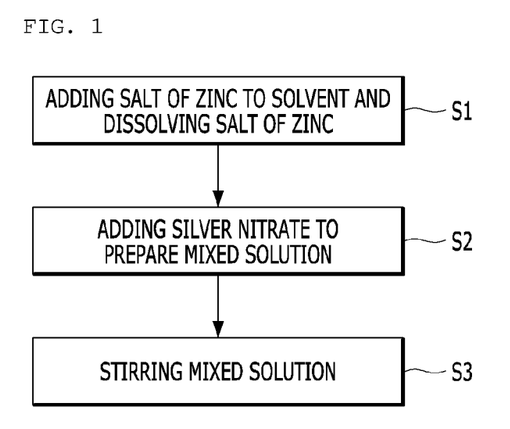
FIG. 1 is a schematic flow chart illustrating a method of preparing an antimicrobial agent according to an exemplary embodiment of the present disclosure.
Figure 2:
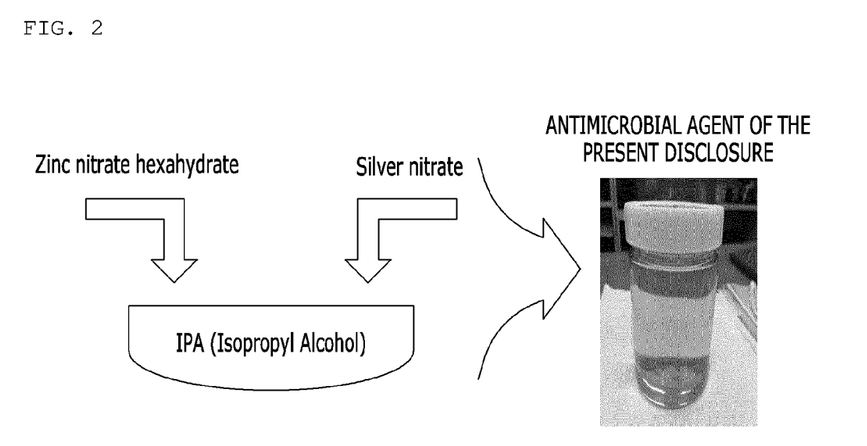
FIG. 2 is a schematic view illustrating the method of preparing an antimicrobial agent according to an exemplary embodiment of the present disclosure.

FIG. 1 is a schematic flow chart illustrating a method of preparing an antimicrobial agent according to an exemplary embodiment of the present disclosure, and FIG. 2 is a schematic view illustrating the method of preparing an antimicrobial agent according to an exemplary embodiment of the present disclosure.

Referring to FIGS. 1 and 2, the method of preparing an antimicrobial agent according to the present disclosure includes: a step i) of adding a salt of zinc to a solvent and dissolving the salt of zinc (S1); a step ii) of adding a salt of silver to a solution to which the salt of zinc is added to prepare a mixed solution (S2); and a step iii) of stirring the mixed solution (S3).

The step i) is step (S1) of adding a salt of zinc to a solvent in advance and dissolving the salt of zinc.

The salt of zinc in the step i) may be included in an amount of 0.1 to 50 parts by weight, preferably 0.1 to 40 parts by weight, more preferably 0.1 to 30 parts by weight, more preferably 0.1 to 20 parts by weight, still more preferably 0.5 to 20 parts by weight, and still more preferably 1 to 20 parts by weight, with respect to the total weight of the antimicrobial agent, in terms of improving antimicrobial activity and solubility and minimizing the influence on physical properties of an applied product. Although not limited thereto, when the salt of zinc is included in an amount of less than 0.1 parts by weight with respect to the total weight of the antimicrobial agent, antimicrobial activity may be insufficient, and when the salt of zinc is included in an amount of more than 50 parts by weight with respect to the total weight of the antimicrobial agent, solubility and compatibility with the salt of silver may be reduced.

Although not limited thereto, the salt of zinc may be preferably one or more of zinc nitrate, zinc perchlorate, and zinc acetate, and more preferably one or more of zinc nitrate hexahydrate ($Zn(NO_3)_2 \cdot 6H_2O$) and zinc perchlorate hexahydrate ($ZnCl_2O_8 \cdot 6H_2O$), in terms of improving antimicrobial activity and solubility, minimizing the influence on physical properties of an applied product, and improving compatibility with the salt of silver.

The solvent in the step i) may be one or more of alcohol and water, and may be appropriately selected depending on a resin composition or product requiring antimicrobial activity to which the antimicrobial agent is applied. The solvent may be one or more selected from isopropyl alcohol (IPA, 2-propanol), water, 2-methoxyethanol, acetonitrile, dimethyl sulfoxide, ethylene glycol, butyl acetate, methyl isobutyl ketone (MIBK, 4-methyl-2-pentanone), propylene glycol methyl ether acetate (PMA), ethanol, N,N-dimethylformamide, ethylene glycol monoethyl ether (2-ethoxyethanol), 1-propyl alcohol (1-propanol), propylene glycol, propylene glycol methyl ether (PGME, 1-methoxy-2-propanol), methyl ethyl ketone (MEK, 2-butanone), xylene, and methyl acetate, but is not limited thereto. The solvent may be more preferably one or more selected from isopropyl alcohol (IPA, 2-propanol), water, 2-methoxyethanol, acetonitrile, dimethyl sulfoxide, ethylene glycol, butyl acetate, methyl isobutyl ketone (4-methyl-2-pentanone), propylene glycol methyl ether acetate, ethanol, N,N-dimethylformamide, and ethylene glycol monoethyl ether (2-ethoxyethanol), and still more preferably one or more selected from isopropyl alcohol (IPA, 2-propanol), water, and 2-methoxyethanol, in terms of improving antimicrobial activity and solubility, minimizing the influence on physical properties of an applied product, and improving compatibility with the salt of zinc and the salt of silver.

The step ii) is step (S2) of adding a salt of silver to a solution prepared in the step i) to which the salt of zinc is added to prepare a mixed solution.

The method of preparing an antimicrobial agent of the present disclosure includes, after the step of adding the salt of zinc to the solvent and dissolving the salt of zinc, the step of adding the salt of silver. When the salt of zinc is dissolved in the solvent in advance and then the salt of silver is added in the above order, solubility of the salt of silver may be remarkably improved. When the salt of zinc and the salt of silver are mixed in the solvent at the same time, or the salt of silver is dissolved in the solvent in advance and then the salt of zinc is mixed, solubility is significantly reduced.

The salt of silver in the step ii) may be included in an amount of 0.1 to 50 parts by weight with respect to the total weight of the antimicrobial agent in terms of improving antimicrobial activity and solubility. The salt of silver may be included in an amount of preferably 0.1 to 30 parts by weight, more preferably 0.1 to 20 parts by weight, still more preferably 0.1 to 10 parts by weight, still more preferably 0.1 to 5 parts by weight, still more preferably 0.1 to 2 parts by weight, and still more preferably 0.5 to 2 parts by weight, with respect to the total weight of the antimicrobial agent, in terms of improving antimicrobial activity and solubility and minimizing the influence on physical properties of an applied product. Although not limited thereto, when the salt of silver is included in an amount of less than 0.1 parts by weight with respect to the total weight of the antimicrobial agent, antimicrobial activity may be insufficient, and when the salt of silver is included in an amount of more than 50 parts by weight, solubility and cost-effectiveness may be reduced.

The salt of silver in the step ii) may be preferably one or more of silver nitrate ($AgNO_3$) and silver acetate ($AgC_2H_3O_2$), and more preferably silver nitrate, in terms of improving antimicrobial activity and solubility, minimizing the influence on physical properties of an applied product, and improving compatibility with the salt of zinc.

Next, the step iii) is step (S3) of stirring the mixed solution prepared in the step ii). A stirring time in the step iii) is preferably 30 minutes to 2 hours in terms of dissolving the salt of silver in the solvent and mixing the salt of silver with the solution to which the salt of zinc is added, and the stirring time is more preferably 50 minutes to 2 hours.

Figure 3:
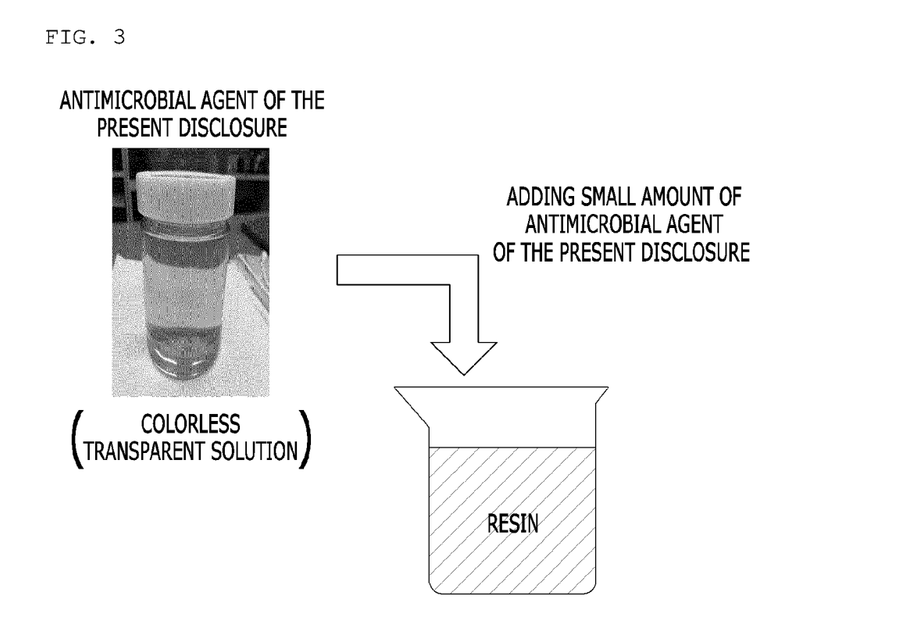
FIG. 3 is a schematic view illustrating a method of preparing an antimicrobial resin composition according to an exemplary embodiment of the present disclosure.

FIG. 3 is a schematic view illustrating a method of preparing an antimicrobial resin composition according to an exemplary embodiment of the present disclosure.

Referring to FIG. 3, the method of preparing an antimicrobial resin composition includes a step of mixing the antimicrobial agent according to the present disclosure with a resin, and the antimicrobial agent is mixed in an amount of 0.5 to 5 parts by weight with respect to the total weight of the antimicrobial resin composition.

In the method of preparing an antimicrobial resin composition of the present disclosure, an antimicrobial agent solution is prepared in advance and then mixed with a resin. When a constituent component of the antimicrobial agent is directly mixed with a resin composition, dispersibility is significantly deteriorated, which may cause deterioration of physical properties of an applied product.

The antimicrobial agent of the present disclosure is included in an amount of preferably 0.5 to 5 parts by weight, more preferably 0.5 to 4 parts by weight, still more preferably 1 to 4 parts by weight, and still more preferably 1 to 3 parts by weight, with respect to the total weight of the antimicrobial resin composition, in terms of improving antimicrobial activity and dispersibility and maintaining the original physical properties of a product to which the antimicrobial resin composition is applied. When the antimicrobial agent is added in an amount of less than 0.5 parts by weight with respect to the total weight of the antimicrobial resin composition, antimicrobial activity may be insufficient, and when the antimicrobial agent is added in an amount of more than 5 parts by weight with respect to the total weight of the antimicrobial resin composition, the solution of the antimicrobial resin composition may be suspended, or when the antimicrobial resin composition is formed into a film or the like, optical properties may be deteriorated and cost-effective may be reduced.

EXAMPLES

Hereinafter, the present disclosure will be described in more detail with reference to Examples.

1. Evaluation of Physical Properties of Film Produced Using Antimicrobial Resin Composition Containing Antimicrobial Agent According to Kind of Salt of Zinc While varying the kind of salt of zinc, 15 parts by weight of a salt of zinc was added to isopropyl alcohol (IPA) as a solvent and the salt of zinc was dissolved, 1 part by weight of silver nitrate ($AgNO_3$) was added to a solution in which the salt of zinc was dissolved, and stirring was performed for 50 minutes to 2 hours, thereby preparing an antimicrobial agent. Thereafter, 1 part by weight of the prepared antimicrobial agent was added to a film resin, and the film resin was cured to produce a film.

Table 1 shows physical properties and antimicrobial activities of the films produced according to the kind of salt of zinc.

TABLE 1

| Items | Kind of zinc salt (15 wt %) | Silver nitrate | Precipitate and solubility | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|---|---|---|
| Bare film | — | — |  | 93.87% | 0.29 | 0.21 | 3H | Excellent | 16% | 0% |
| Films to which 1 wt % of antimicrobial agent of the present disclosure is added in total | Zinc nitrate hexahydrate | 1 wt % | No precipitates and excellent solubility | 93.88% | 0.28 | 0.20 | 3H | Excellent | 99.99% | 99.99% |
|  | Zinc perchlorate hexahydrate |  | No precipitates and excellent solubility | 93.52% | 0.35 | 0.32 | 3H | Excellent | 99.99% | 99.99% |
|  | Zinc oxide |  | Not dissolved and changed to white |  |  |  |  |  |  |  |
|  | Zinc stearate |  | Not dissolved and changed to white |  |  |  |  |  |  |  |
|  | Zinc sulfate heptahydrate |  | Not dissolved and changed to white |  |  |  |  |  |  |  |
|  | Zinc acetate dihydrate |  | Generation of precipitates, but good solubility | 90.34% | 1.02 | 0.97 | 3H | Excellent | 99.99% | 99.99% |

Referring to Table 1, in a case where the salt of zinc was zinc nitrate hexahydrate ($Zn(NO_3)_2 \cdot 6H_2O$), zinc perchlorate hexahydrate ($ZnCl_2O_8 \cdot 6H_2O$), or zinc acetate dehydrate ($Zn(CH_3COO)_2 \cdot 2H_2O$), it was shown that the solubility in the solvent was excellent, and the deterioration of the physical properties of the film containing the antimicrobial agent was not significant. In addition, it could be confirmed that the antimicrobial activities to *Escherichia coli* and *Staphylococcus aureus* were 99.99%, which were excellent. In particular, in the cases of the films produced using the antimicrobial resin composition containing the antimicrobial agent in which the salt of zinc was zinc nitrate hexahydrate ($Zn(NO_3)_2 \cdot 6H_2O$) or zinc perchlorate hexahydrate ($ZnCl_2O_8 \cdot 6H_2O$), it could be confirmed that the physical properties such as the transmittance, the pencil hardness, and the adhesive force were maintained almost similar to the original physical properties as compared to the film in which the antimicrobial agent of the present disclosure was not added.

In the case of the IPA-based solvent, it was confirmed that when zinc nitrate hexahydrate ($Zn(NO_3)_2 \cdot 6H_2O$) or zinc perchlorate hexahydrate ($ZnCl_2O_8 \cdot 6H_2O$) was added as the salt of zinc, the solubility, the antimicrobial activity, and various physical properties were most appropriately maintained.

2. Evaluation of Physical Properties of Film Produced Using Antimicrobial Resin Composition Containing Antimicrobial Agent According to Kind of Salt of Silver While varying the kind of salt of silver, 15 parts by weight of a salt of zinc was added to isopropyl alcohol (IPA) as a solvent and the salt of zinc was dissolved, 1 part by weight of a salt of silver was added to a solution in which the salt of zinc was dissolved, and stirring was performed for 50 minutes to 2 hours, thereby preparing an antimicrobial agent. Thereafter, 1 part by weight of the prepared antimicrobial agent was added to a film resin, and the film resin was cured to produce a film.

Table 2 shows physical properties and antimicrobial activities of the films produced according to the kind of salt of silver.

and in particular, when the salt of silver was silver nitrate, the physical properties were maintained almost similar to the original physical properties. In addition, it could be confirmed that the antimicrobial activities to *Escherichia coli* and *Staphylococcus aureus* were 99.99%, which were excellent.

In the case of the IPA-based solvent, it was confirmed that when silver nitrate was added as the salt of silver, the solubility, the antimicrobial activity, and various physical properties were most appropriately maintained.

3. Evaluation of Physical Properties of Film Produced Using Antimicrobial Resin Composition Containing Antimicrobial Agent According to Amounts of Salt of Zinc and Salt of Silver Added While varying the amounts of the zinc nitrate hexahydrate ($Zn(NO_3)_2 \cdot 6H_2O$) as a salt of zinc and the silver nitrate ($AgNO_3$) added, 1 part by weight, 5 parts by weight, 15 parts by weight, or 20 parts by weight of zinc nitrate hexahydrate was added to isopropyl alcohol (IPA) as a solvent and the zinc nitrate hexahydrate was dissolved, 0.5 parts by weight, 1 part by weight, 1.5 parts by weight, or 2 parts by weight of silver nitrate was added to a solution in which the zinc

TABLE 2

| Items | Zinc nitrate hexahydrate | Kind of silver salt (1 wt %) | Precipitate and solubility | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|---|---|---|
| Bare film | — | — |  | 93.87% | 0.29 | 0.21 | 3H | Excellent | 16% | 0% |
| Films to which 1 wt % of antimicrobial agent of the present disclosure is added in total | 15 wt % | Silver nitrate | No precipitates and excellent solubility | 93.88% | 0.28 | 0.20 | 3H | Excellent | 99.99% | 99.99% |
|  |  | Silver chloride | Not dissolved and changed to white |  |  |  |  |  |  |  |
|  |  | Silver acetate | Generation of precipitates, but good solubility | 91.34% | 0.77 | 0.57 | 3H | Excellent | 99.99% | 99.99% |

Referring to Table 2, in the cases of the films produced using the antimicrobial resin composition containing the antimicrobial agent in which the salt of silver was silver nitrate ($AgNO_3$) or silver acetate ($AgC_2H_3O_2$), it was confirmed that the influence on the physical properties such as the transmittance, the pencil hardness, and the adhesive force was small as compared to the film in which the antimicrobial agent of the present disclosure was not added, nitrate hexahydrate was dissolved, and stirring was performed for 50 minutes to 2 hours, thereby preparing an antimicrobial agent. Thereafter, 1 part by weight of the prepared antimicrobial agent was added to a film resin, and the film resin was cured to produce a film.

Table 3 shows physical properties and antimicrobial activities of the films produced according to the amounts of the salt of zinc and the salt of silver added.

TABLE 3

| Items | Zinc nitrate hexahydrate | Silver nitrate | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|---|---|
| Bare film | — | — | 93.87% | 0.29 | 0.21 | 3H | Excellent | 16% | 0% |
| Films to which 1 wt % of antimicrobial agent of the present disclosure is added in total | 1 wt % | 0.5 wt % | 93.13% | 0.27 | 0.16 | 3H | Excellent | 58.48% | 72.52% |
|  |  | 1 wt % | 93.58% | 0.31 | 0.18 | 3H | Excellent | 99.99% | 99.99% |
|  |  | 1.5 wt % | 93.77% | 0.33 | 0.20 | 3H | Excellent | 87.24% | 99.99% |
|  |  | 2.0 wt % | 93.90% | 0.30 | 0.30 | 3H | Excellent | 91.65% | 99.99% |
|  | 5 wt % | 0.5 wt % | 93.12% | 0.28 | 0.31 | 3H | Excellent | 99.99% | 99.99% |
|  |  | 1 wt % | 93.88% | 0.28 | 0.20 | 3H | Excellent | 99.99% | 99.99% |
|  |  | 1.5 wt % | 93.59% | 0.31 | 0.19 | 3H | Excellent | 99.99% | 99.99% |
|  |  | 2.0 wt % | 93.87% | 0.36 | 0.23 | 3H | Excellent | 99.99% | 99.99% |
|  | 15 wt % | 0.5 wt % | 93.40% | 0.34 | 0.24 | 3H | Excellent | 99.99% | 99.99% |
|  |  | 1 wt % | 93.67% | 0.33 | 0.28 | 3H | Excellent | 99.99% | 99.99% |

TABLE 3-continued

| Items | Zinc nitrate hexahydrate | Silver nitrate | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|---|---|
| | | 1.5 wt % | 93.14% | 0.38 | 0.31 | 3H | Excellent | 99.99% | 99.99% |
| | | 2.0 wt % | 93.87% | 0.29 | 0.29 | 3H | Excellent | 99.99% | 99.99% |
| | 20 wt % | 0.5 wt % | 93.10% | 0.45 | 0.34 | 3H | Excellent | 99.99% | 99.99% |
| | | 1 wt % | 93.09% | 0.44 | 0.46 | 2H | Excellent | 99.99% | 99.99% |
| | | 1.5 wt % | 93.20% | 0.58 | 0.51 | 2H | Excellent | 99.99% | 99.99% |
| | | 2.0 wt % | 93.11% | 0.49 | 0.55 | 2H | Excellent | 99.99% | 99.99% |

Referring to Table 3, in the cases of the films produced using the antimicrobial resin composition containing the antimicrobial agent in which the salt of zinc was zinc nitrate hexahydrate ($Zn(NO_3)_2 \cdot 6H_2O$) and the salt of silver was silver nitrate ($AgNO_3$), it could be confirmed that when the amounts of the zinc nitrate hexahydrate and the silver nitrate added were appropriately adjusted, the physical properties such as the transmittance, the pencil hardness, and the adhesive force were maintained almost similar to the original physical properties as compared to the film in which the antimicrobial agent of the present disclosure was not added. In addition, it could be confirmed that the antimicrobial activities to *Escherichia coli* and *Staphylococcus aureus* were 99.99%, which were excellent.

It was confirmed that the antimicrobial activity and various physical properties were most preferably maintained when the zinc nitrate hexahydrate was added in an amount of 5 parts by weight or 15 parts by weight with respect to the total weight of the antimicrobial agent and the silver nitrate was added in an amount of 0.5 parts by weight, 1 part by weight, 1.5 parts by weight, or 2 parts by weight with respect to the total weight of the antimicrobial agent.

4. Evaluation of Solubility According to Dissolution Order of Salt of Zinc and Salt of Silver and Physical Properties of Film Produced Using Antimicrobial Resin Composition Containing Antimicrobial Agent While varying the dissolution order of a salt of zinc and a salt of silver, 15 parts by weight of zinc nitrate hexahydrate ($Zn(NO_3)_2 \cdot 6H_2O$) as a salt of zinc and 1 part by weight of silver nitrate ($AgNO_3$) were added to isopropyl alcohol (IPA) as a solvent, and then, stirring was performed for 50 minutes to 2 hours, thereby preparing an antimicrobial agent. Thereafter, 1 part by weight of the prepared antimicrobial agent was added to a film resin, and the film resin was cured to produce a film.

Figure 4:
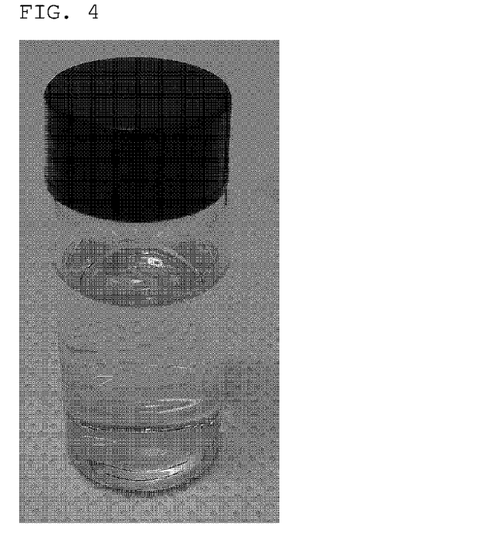
FIG. 4 is a photograph illustrating an antimicrobial agent prepared in the order of dissolving a salt of zinc in a solvent and then dissolving a salt of silver according to an example of the present disclosure.

FIG. 4 is a photograph illustrating an antimicrobial agent prepared in the order of dissolving a salt of zinc in a solvent and then dissolving a salt of silver according to an example of the present disclosure.

Figure 5:
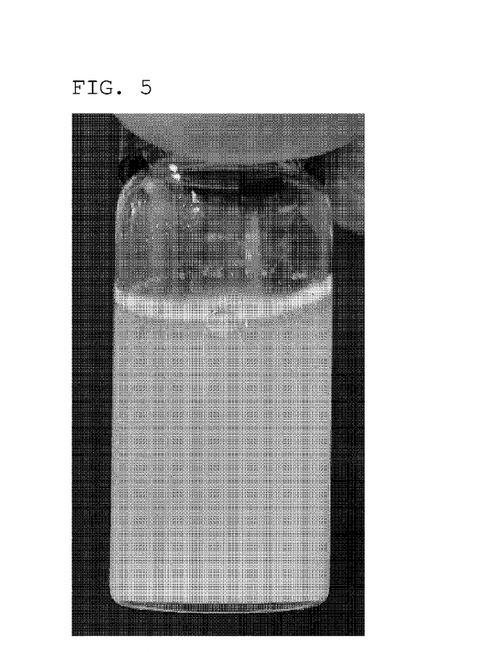
FIG. 5 is a photograph illustrating an antimicrobial agent prepared in the order of dissolving a salt of silver in a solvent and then dissolving a salt of zinc according to a comparative example of the present disclosure.

FIG. 5 is a photograph illustrating an antimicrobial agent prepared in the order of dissolving a salt of silver in a solvent and then dissolving a salt of zinc according to a comparative example of the present disclosure.

Figure 6:
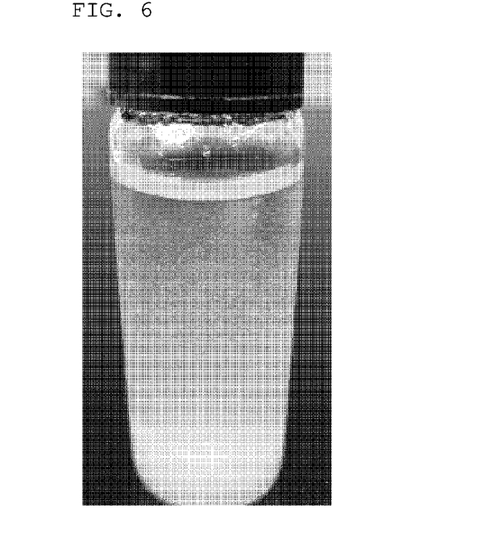
FIG. 6 is a photograph illustrating an antimicrobial agent prepared by mixing a solution in which a salt of zinc is dissolved and a solution in which a salt of silver is dissolved according to a comparative example of the present disclosure.

FIG. 6 is a photograph illustrating an antimicrobial agent prepared by mixing a solution in which a salt of zinc is dissolved and a solution in which a salt of silver is dissolved according to a comparative example of the present disclosure.

Referring to FIGS. 4 to 6, in the case of the antimicrobial agent prepared in the order of dissolving a salt of zinc in a solvent in advance and then dissolving a salt of silver, it can be confirmed that the solubilities of the salt of zinc and the salt of the silver are high because the solution is transparent without precipitates. On the other hand, in the case of the antimicrobial agent prepared in the order of dissolving a salt of silver in a solvent in advance and then dissolving a salt of zinc, it can be confirmed that the solubilities of the salt of zinc and the salt of the silver are low because the solution is opaque due to a large amount of precipitates. In addition, it can be confirmed that in the case of the antimicrobial agent prepared by preparing a solution obtained by dissolving each of a salt of zinc and a salt of silver in a solvent and mixing the prepared zinc salt solution and the prepared silver salt solution, the solubility is low because the solution is opaque due to a large amount of precipitates.

Table 4 shows the physical properties and antimicrobial activities of the films produced using the antimicrobial resin composition containing the antimicrobial agent prepared by varying the dissolution order of the salt of zinc and the salt of silver.

TABLE 4

| Items | Addition order | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|---|
| Bare film | Control group | 93.87% | 0.29 | 0.21 | 3H | Excellent | 16% | 0% |
| Films to which 1 wt % of antimicrobial agent of the present disclosure is added in total | Zinc salt → silver salt (Example) | 93.58% | 0.31 | 0.18 | 3H | Excellent | 99.99% | 99.99% |
| | Silver salt → zinc salt (Comparative Example) | 85.11% | 4.19 | 1.55 | 1H | Not excellent | 99.99% | 99.99% |
| | Zinc salt solution + silver salt solution (Comparative Example) | 85.96% | 5.87 | 1.91 | 1H | Not excellent | 99.99% | 99.99% |

Referring to Table 4, in the cases of the films produced using the antimicrobial resin composition containing the antimicrobial agent of the present disclosure in which the salt of zinc was dissolved in the solvent and then the salt of silver was dissolved according to the present disclosure, it could be confirmed that the physical properties such as the transmittance, the pencil hardness, and the adhesive force were maintained almost similar to the original physical properties as compared to the film produced using the resin composition in which the antimicrobial agent was not added. In addition, it could be confirmed that the antimicrobial activities to *Escherichia coli* and *Staphylococcus aureus* were 99.99%, which were excellent.

On the other hand, in the cases of the films produced using the antimicrobial resin composition containing the antimicrobial agent of a comparative example in which the salt of silver was dissolved in the solvent and then the salt of zinc was dissolved, the antimicrobial activities to *Escherichia coli* and *Staphylococcus aureus* were 99.99%, which were excellent, but the physical properties such as the transmittance, the pencil hardness, and the adhesive force were significantly deteriorated, as compared to the film in which the antimicrobial agent was not added.

It was confirmed that when the antimicrobial agent of the present disclosure was prepared by dissolving a salt of zinc in a solvent in advance and then dissolving a salt of silver, the antimicrobial activity and various physical properties could be most preferably maintained.

5. Evaluation of Physical Properties of Film Produced Using Antimicrobial Resin Composition According to Amount of Antimicrobial Agent Added The antimicrobial agent prepared by adding zinc nitrate hexahydrate $(Zn(NO_3)_2 \cdot 6H_2O)$ as a salt of zinc and silver nitrate $(AgNO_3)$ was added in an amount of 0.5 parts by weight, 1 part by weight, 3 parts by weight, and 5 parts by weight with respect to the total weight of a film resin while varying the amount of the antimicrobial agent added, and the antimicrobial agent was cured to produce a film.

Figure 7:
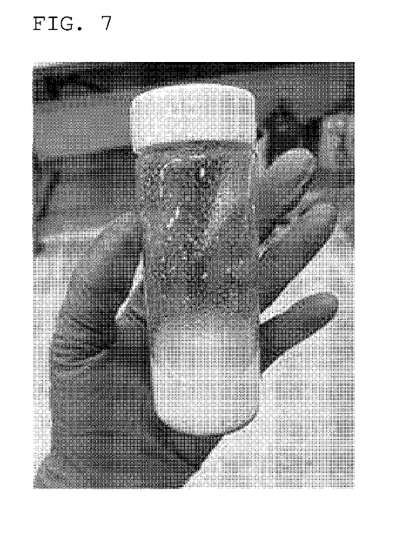
FIG. 7 is a photograph illustrating an antimicrobial resin composition according to an excessive addition of an antimicrobial agent prepared according to an exemplary embodiment of the present disclosure.

FIG. 7 is a photograph illustrating an antimicrobial resin composition according to an excessive addition of an antimicrobial agent prepared according to an exemplary embodiment of the present disclosure.

Table 5 shows physical properties and antimicrobial activities of the films produced according to the amount of the antimicrobial agent added.

antimicrobial activities to *Escherichia coli* and *Staphylococcus aureus* were slightly low, and when the amount of the antimicrobial agent added was 1 part by weight, 3 parts by weight, or 5 parts by weight, the antimicrobial activities to *Escherichia coli* and *Staphylococcus aureus* were 99.99%, which were excellent.

Referring to FIG. 7, it is confirmed that when the amount of the antimicrobial agent added exceeds 5 parts by weight, the solution is suspended. Therefore, it can be appreciated that when a film is produced using the antimicrobial resin composition, the optical properties such as the transmittance may be deteriorated.

According to the exemplary embodiments described above, in a case of a product such as a film produced using the antimicrobial resin composition of the present disclosure mixed with the antimicrobial agent containing the solution in which the salt of zinc is dissolved in the solvent and the salt of silver, it may be expected to maximize antimicrobial activity and minimize the influence on physical properties of an applied product by adjusting kinds, addition amounts, and a dissolution order of the salt of zinc and the salt of silver to the optimal conditions and adjusting the amount of the antimicrobial agent added to the optimal condition.

As set forth above, according to an exemplary embodiment, the antimicrobial agent of the present disclosure contains a solution in which a salt of zinc is dissolved in a solvent and silver nitrate, has excellent antimicrobial activity even when a small amount is added, and is safe.

According to an exemplary embodiment, the antimicrobial agent and the antimicrobial resin composition of the present disclosure may maximize antimicrobial activity even when a small amount is added and may minimize the influence on physical properties of an applied product such as an antimicrobial film by adjusting the amounts of the salt of zinc and the silver nitrate added.

According to an exemplary embodiment, the antimicrobial resin composition of the present disclosure may maximize antimicrobial activity and minimize the influence on physical properties of an applied product such as an antimicrobial film by adjusting the amount of the antimicrobial agent of the present disclosure added to a resin.

Therefore, when the antimicrobial agent and the antimicrobial resin composition of the present disclosure are used

TABLE 5

| Addition amount | Transmittance | Haze | B* | Pencil hardness | Adhesive force | Antimicrobial activity (*Escherichia coli*) | Antimicrobial activity (*Staphylococcus aureus*) |
|---|---|---|---|---|---|---|---|
| 0 wt % | 93.87% | 0.29 | 0.21 | 3H | Excellent | 16% | 0% |
| 0.5 wt % | 93.90% | 0.15 | 0.21 | 3H | Excellent | 97.28% | 98.61% |
| 1 wt % | 93.13% | 0.27 | 0.16 | 3H | Excellent | 99.99% | 99.99% |
| 3 wt % | 93.07% | 0.31 | 0.43 | 3H | Excellent | 99.99% | 99.99% |
| 5 wt % | 92.97% | 0.58 | 0.60 | 2H | Excellent | 99.99% | 99.99% |

Referring to Table 5, in the cases of the films produced using the antimicrobial resin composition containing the antimicrobial agent of the present disclosure, it could be confirmed that the physical properties such as the transmittance, the pencil hardness, and the adhesive force were maintained almost similar to the original physical properties as compared to the film in which the antimicrobial agent was not added. However, it could be confirmed that when the amount of the antimicrobial agent added was 0.5 parts by weight, the physical properties were maintained, but the for a hard coating resin for an electronic material, antimicrobial activity may be continuously exerted while maintaining the original physical properties of the resin.

According to an exemplary embodiment, in the method of preparing an antimicrobial agent of the present disclosure, the salt of zinc is dissolved in a solvent in advance and then a salt of silver is added, and the amount of the salt of zinc added to the solvent and the amount of the salt of silver added are adjusted, such that it is possible to efficiently prepare an antimicrobial agent that may maximize antimicrobial activity and minimize the influence on physical properties of an applied product such as an antimicrobial film.

According to an exemplary embodiment, in the method of preparing an antimicrobial resin composition of the present disclosure, it is possible to efficiently prepare an antimicrobial resin composition that may maximize antimicrobial activity and minimize the influence on physical properties of an applied product such as an antimicrobial film by adjusting the amount of the antimicrobial agent of the present disclosure added to a resin.

Therefore, the methods of preparing an antimicrobial agent and an antimicrobial resin composition of the present disclosure may provide an antimicrobial agent and an antimicrobial resin composition using a safe and inexpensive material, such that the antimicrobial agent and the antimicrobial resin composition may be efficiently used for a hard coating antimicrobial resin for an electronic material such as an IT device, for example, a smartphone, a laptop, a monitor, or the like.

Although the present disclosure has been described in detail with reference to specific exemplary embodiments, they are for specifically describing the present disclosure and thus the present disclosure is not limited thereto, but those skilled in the art will appreciate that various modifications or improvements are possible. All simple modifications and variations of the present disclosures fall within the scope of the present disclosure, and the detailed scope of the present disclosure will be apparent by the appended claims.

What is claimed is:

1. An antimicrobial film comprising:
   1 to 5 wt % of an antimicrobial agent based on a total weight of the antimicrobial film; and
   a film resin,
   wherein the antimicrobial agent includes:
      a solvent or a mixture of solvents;
      a salt of zinc or salts of zinc dissolved in the solvent or the mixture of solvents; and
      a salt of silver or salts of silver dissolved in the solvent or the mixture of solvents,
   wherein the salt of zinc or salts of zinc are one or more of zinc nitrate hexahydrate ($Zn(NO_3)_2 \cdot 6H_2O$) and zinc perchlorate hexahydrate ($ZnCl_2O_8 \cdot 6H_2O$),
   wherein the salt of silver or salts of silver are one or more of silver nitrate ($AgNO_3$) and silver acetate ($AgC_2H_3O_2$),
   wherein the salt of zinc or salts of zinc are contained in an amount of 1 to 20 parts by weight with respect to a total weight of the antimicrobial agent,
   wherein the salt of silver or salts of silver are contained in an amount of 0.5 to 2.0 parts by weight with respect to the total weight of the antimicrobial agent, and
   wherein the solvent or the mixture of solvents is contained in an amount of 78 to 98.5 parts by weight with respect to the total weight of the antimicrobial agent,
   wherein the solvent or the mixture of solvents is one or more selected from the group consisting of isopropyl alcohol (IPA, 2-propanol) and ethylene glycol and
   wherein the antimicrobial agent is characterized by suppressing decline in at least one of transmittance and adhesion of the film resin.

2. The antimicrobial film of claim 1, wherein the salt of silver is silver nitrate ($AgNO_3$).

* * * * *